US005248999A

United States Patent [19]

Mochizuki et al.

[11] Patent Number: 5,248,999

[45] Date of Patent: Sep. 28, 1993

[54] INK JET PRINTING APPARATUS HAVING INK PURGING FEATURE

[75] Inventors: Seiji Mochizuki; Kazuhisa Kawakami; Tsuyoshi Tomii; Toshio Kumagai, all of Nagano, Japan

[73] Assignee: Seiko Epson Corporation, Tokyo, Japan

[21] Appl. No.: 774,861

[22] Filed: Oct. 11, 1991

[30] Foreign Application Priority Data

| | | | |
|---|---|---|---|
| Oct. 12, 1990 | [JP] | Japan | 2-273631 |
| Oct. 12, 1990 | [JP] | Japan | 2-273632 |
| Oct. 12, 1990 | [JP] | Japan | 2-273633 |
| Oct. 18, 1990 | [JP] | Japan | 2-279794 |
| Oct. 30, 1990 | [JP] | Japan | 2-293436 |
| Nov. 1, 1990 | [JP] | Japan | 2-296003 |
| Jul. 9, 1991 | [JP] | Japan | 3-194817 |

[51] Int. Cl.[5] ...................... G01D 15/16; G01D 15/18

[52] U.S. Cl. .................................. 346/140 R; 346/75

[58] Field of Search .............................. 346/140 R, 75

[56] References Cited

U.S. PATENT DOCUMENTS

| | | | |
|---|---|---|---|
| 4,031,561 | 6/1977 | Paranjpe | 346/1.1 |
| 4,293,867 | 10/1981 | Isayama | 346/140 R |
| 4,571,600 | 2/1986 | Hara | 346/140 R |
| 4,577,203 | 3/1986 | Kawamura | 346/140 R |
| 4,926,196 | 5/1990 | Mizoguchi et al. | 346/140 R |
| 4,947,187 | 8/1990 | Iwagami | 346/1.1 |
| 4,965,596 | 10/1990 | Nagoshi et al. | 346/140 R |

FOREIGN PATENT DOCUMENTS

| | | |
|---|---|---|
| 0358487A2 | 3/1990 | European Pat. Off. . |
| 20427202 | 5/1991 | European Pat. Off. . |

OTHER PUBLICATIONS

Patent Abstracts of Japan, vol. 12, No. 269 (M-723) Jul. 27, 1988.

Patent Abstracts of Japan, vol. 13, No. 449 (M-878) Oct. 9, 1989.

Patent Abstracts of Japan, vol. 12, No. 360 (M-746)(3207) Sep. 27, 1988.

Patent Abstracts of Japan, vol. 10, No. 33 (M-452) Feb. 8, 1986.

*Primary Examiner*—Benjamin R. Fuller

*Assistant Examiner*—Eric Frahm

*Attorney, Agent, or Firm*—Sughrue, Mion, Zinn, Macpeak & Seas

[57] ABSTRACT

An ink jet type recording device has a recording head which is moved over a recording sheet to jet ink droplets to form dots on it, an ink tank for supplying ink to the recording head, a cap member arranged outside the printing region in such a manner that it is moved to and from the recording head, a suction pump having an ink sucking inlet connected to the cap member and an ink discharging outlet connected to a waste ink tank. Also, a switch is provided for starting the suction pump; a memory circuit is provided for storing data representing the quantity of waste ink sucked out by the suction pump; and a control circuit is provided for nullifying an ink purging instruction when the sum of the quantities of waste ink exceeds a predetermined value. When it is detected through the memory circuit that the sum of the quantities of waste ink thus sucked out is beyond the capacity of the waste ink tank, the ink purging operation is suspended irrespective of a forcible ink purging instruction from the switch.

4 Claims, 6 Drawing Sheets

INK JET PRINTING APPARATUS HAVING INK PURGING FEATURE

FIELD OF THE INVENTION

This invention relates to an ink jet type printing apparatus in which ink is supplied from an ink tank to a nozzle to jet therefrom ink droplets so as to record characters, etc. on a recording medium. More particularly, the invention pertains to a technique of supplying or filling the recording head of an ink jet type recording head with ink.

This application is based on and claims priority from Japanese Application No. Hei. 2-273631 filed Oct. 12, 1990, the disclosure of which is incorporated by reference herein.

BACKGROUND OF THE INVENTION

In an ink jet type recording apparatus in which a nozzle is used to jet ink droplets to print characters and images on a recording sheet, the nozzle opening is considerably small. Hence, if foreign matter such as paper dust sticks on the nozzle or bubbles are formed in the ink supply line, the ink droplets are not satisfactorily formed, and hence the resultant print is low in quality.

In order to eliminate this difficulty, an improved ink jet type recording apparatus has been proposed (EP-427202A). This recording apparatus has a restoring device for forcibly purging ink to remove foreign matter or bubbles from the ink flow line, and an externally operated switch to activate the restoring device. That is, the recording apparatus is designed so that, when the resultant print is unsatisfactory in print quality, the switch is operated to activate the restoring device, thereby to restore the printing operation.

The restoring device is used also in the case where the recording head is replaced with a new one, or the ink tank is replaced with a new one, or the recording apparatus is not used for a long time. That is, in these cases, it is used to purge ink for adjustment of the ink flow line.

On the other hand, a recording head is filled with a maintenance solution when shipped from the factory. Therefore, before a new recording head is used, it is essential to completely remove the maintenance solution from the recording head. For this purpose, a large quantity of ink is purged through the new recording head when compared with the quantity of ink purged from the ink flow line.

The ink thus discharged for replacement of the recording head or for restoration of the proper printing function is sent to a waste ink tank provided in the recording apparatus body. The waste ink tank is limited in volume because the casing of the recording apparatus body is also limited in space.

The above-described restoring operation is essential for maintaining the print quality high. However, if it is carried out repeatedly in an excessive fashion, then not only is a large quantity of ink wasted, but also the ink leaks from the waste ink tank which is limited in volume.

SUMMARY OF THE INVENTION

In view of the foregoing, an object of this invention is to provide an ink jet type recording apparatus in which the leakage of ink from the waste ink tank is positively prevented.

Another object of the invention is to provide an ink jet type recording apparatus in which an ink sucking operation is carried out, both when the recording head is charged with ink and when the resultant print is unsatisfactory in print quality, and useless consumption of ink is eliminated; that is, the ink is economically used.

The foregoing objects and other objects of the invention have been achieved by providing an ink jet type recording apparatus which, according to the invention, has a recording head mounted on a carriage in such a manner that is moved along a recording sheet in a widthwise direction thereof, to jet ink droplets to form dots on the recording sheet. Further, an ink tank for supplying ink through an ink supplying path to the recording head is provided. A cap member arranged outside a printing region in such a manner that the cap member is moved to and from the nozzle opening of the recording head is also provided. A suction pump having an ink sucking inlet which is connected to the cap member, and an ink discharging outlet which is connected to a waste ink tank are also provided. An instructing means which is externally operated to start the suction pump, a quantity of waste-ink controlling means for controlling a quantity of waste ink sucked by the suction pump, and means for disabling the instructing means when the quantity of waste ink exceeds a predetermined value are furthermore provided.

If the resultant print is unsatisfactory in print quality, the suction pump is operated with the cap member coupled to the recording head to apply a negative pressure to the nozzle. As a result, the ink in the ink tank is forcibly purged through the nozzle, thus removing bubbles from the ink supplying path or dust from the nozzle. The quantity of ink thus forcibly discharged is measured. When the quantity of ink thus measured reaches a predetermined value, i.e., the volume of the waste ink tank, the latter is replaced with a new one. In the case where it is necessary to perform the forcible ink purging operation frequently in a short period of time, the probability is high that the problem cannot be solved by the ink purging operation. Therefore, in this case, in order to eliminate the difficulty that a large quantity of ink is wasted by repeating the ink purging operation, the ink purging operation is suspended irrespective of the ink purging instruction provided by the user.

The nature, utility and principle of the invention will be more clearly understood from the following detailed description and the appended claims when read in conjunction with the accompanying drawings.

DETAILED DESCRIPTION OF THE PREFERRED EMBODIMENTS

Figure 2:
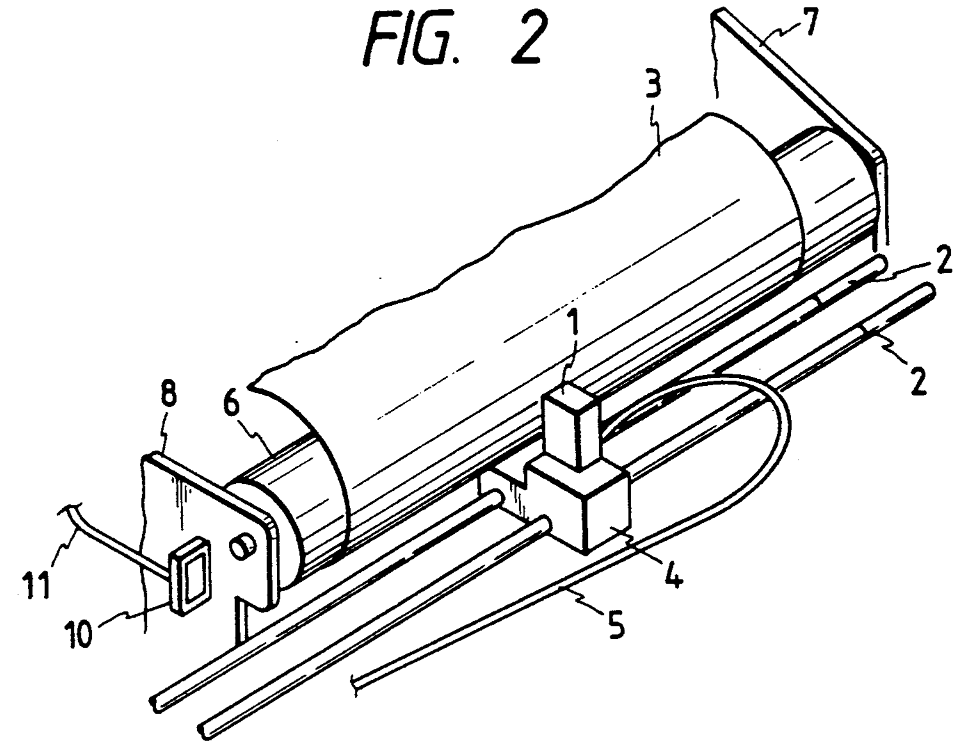
FIG. 2 is a perspective view showing a part of the ink jet type recording apparatus of the invention, showing, components arranged around the platen of the apparatus.

An example of an ink jet type recording apparatus according to the invention, as shown in FIG. 2, includes: an ink jet type recording head 1 having a plurality of nozzles arranged so as to confront a printing surface. The recording head 1 is mounted on a carriage 4 which is reciprocated on two guide members 2 so as to scan a recording sheet 3 in the widthwise direction. The recording head 1 receives ink through a tube 5 from an ink tank 24 (described later). The recording apparatus further includes: a platen 6 for supporting the recording sheet 3, and supporting plates 7 and 8 which rotatably support the platen 6 at both ends. A cap member 10 is provided outside the printing area (on the left-handed side of FIG. 2) in such a manner that it can be brought into contact with the front surface of the recording head 1. The cap member 10 is connected through a tube 11 to a suction pump 20.

Figure 3:
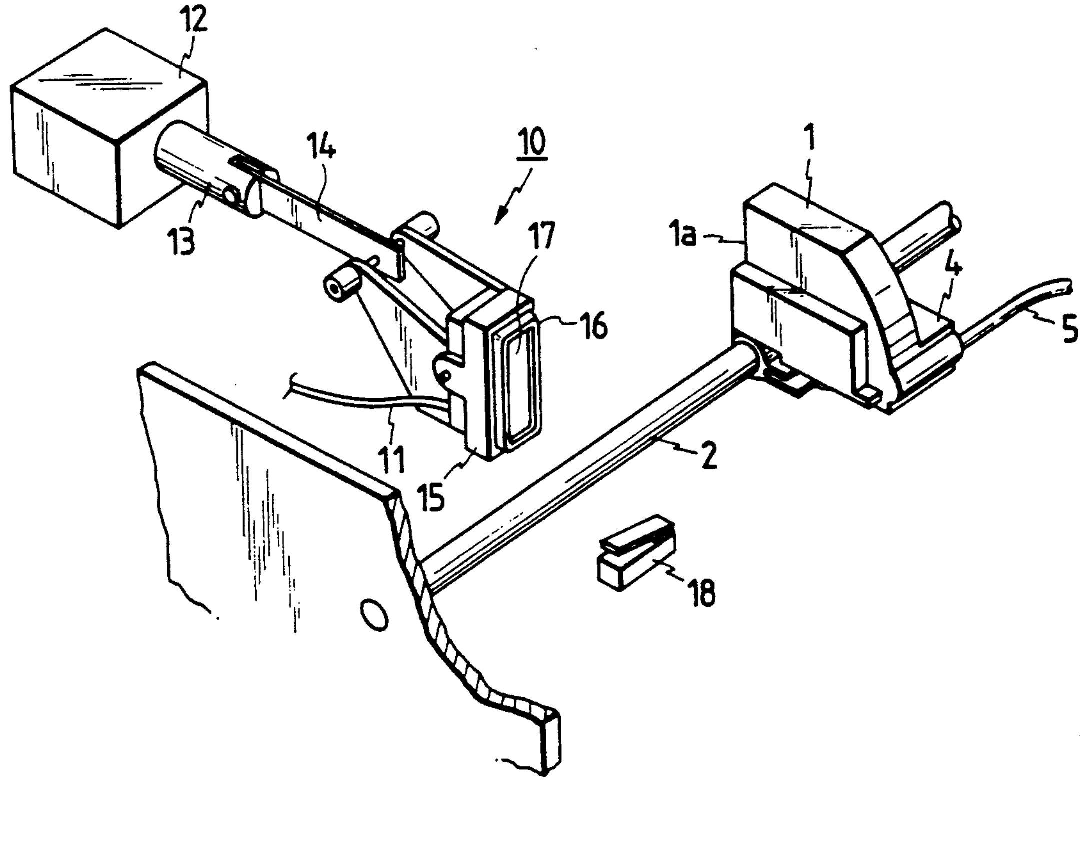
FIG. 3 is a perspective view showing an ink sucking mechanism and components around it in the ink jet type recording apparatus.

The cap member 10 is shown in FIG. 3 in more detail. The cap member 10 includes a solenoid 12, a rod 13 driven by the solenoid 12, an arm 14, and a base member 15 which is moved back and forth through the rod 13 and the arm 14 by the solenoid 12. An elastic member 16 is provided on the front surface of the base member 15 which confronts with the nozzle surface of the recording head 1, the elastic member 16 surrounding the front surface of the recording head 1, thus forming a nozzle accommodating chamber 17. The suction pump 20 (not shown) in FIG. 3 applies a negative pressure to the nozzle accommodating chamber 17 through the tube 11.

In FIG. 3, reference numeral 18 designates a position detector. When the recording head 1 is moved to the position where it confronts the cap member 10, the carriage 4 is brought into contact with the position detector 18, as a result of which the latter produces a detection signal. The detection signal is applied to a control circuit 26 (not shown in FIG. 3 and to be described later), so that the solenoid 12 is activated to move the base member 15 to the nozzle surface 1*a* of the recording head 1. That is, the nozzle surface 1*a* of the recording head 1 is sealingly closed by the cap member 10.

Figure 1:
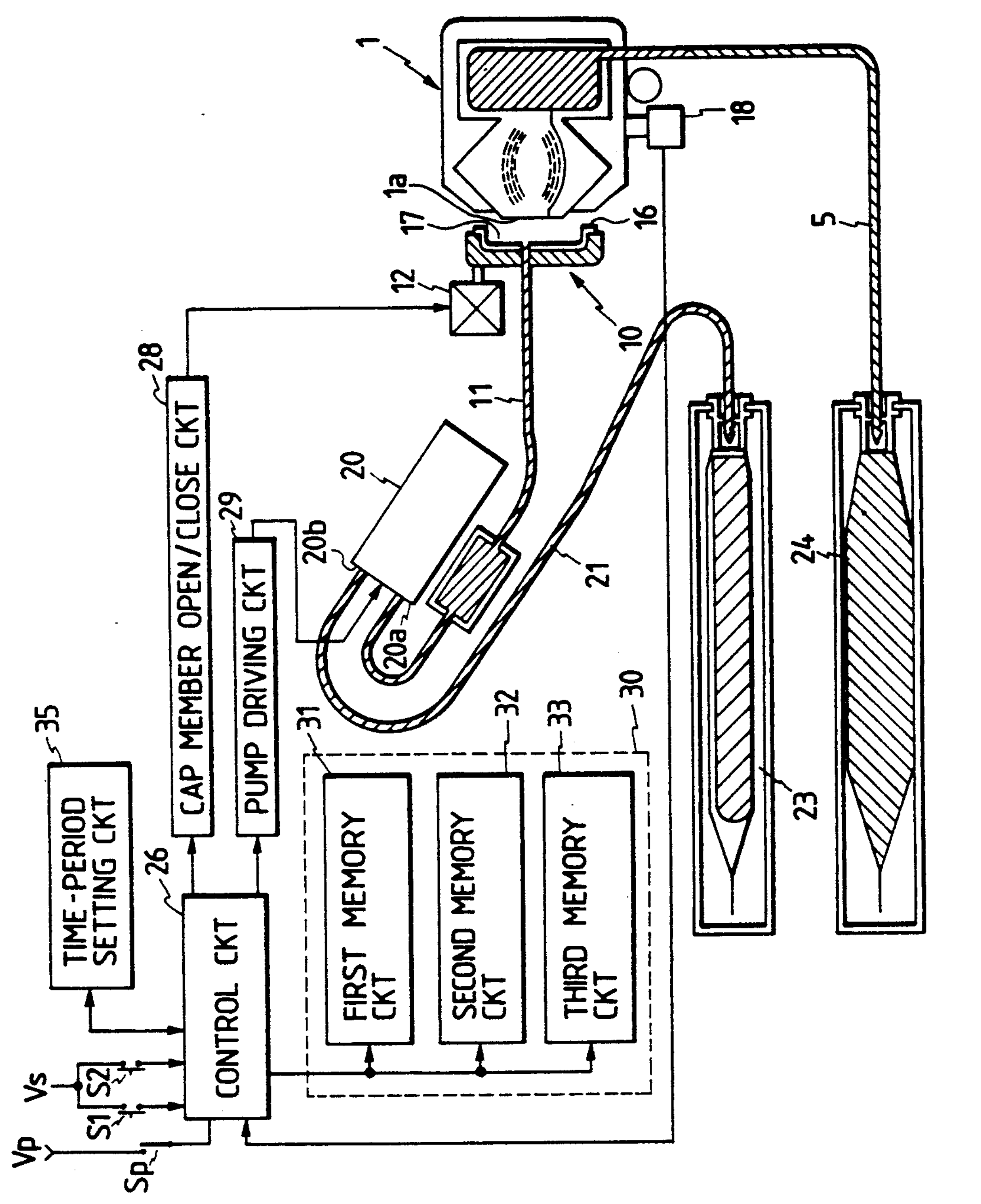
FIG. 1 is an explanatory diagram showing the arrangement of an example of an ink jet type recording apparatus according to this invention.

The recording apparatus, as shown in FIG. 1, has an ink supplying path, an ink sucking path used to restore the printing capability of the apparatus, and control device therefor.

In FIG. 1, reference numeral 20 designates the aforementioned suction pump, which has an ink sucking inlet 20*a* connected through the tube 11 to the nozzle accommodating chamber 17 of the cap member 10, and an ink discharging outlet 20*b* connected through a tube 21 to a waste ink tank 23.

Further in FIG. 1, reference numeral 24 designates the aforementioned ink tank 14 which is connected through the tube 5 to the recording head 1; 26, a control circuit for controlling various operations of the printing apparatus, the control circuit being made up of a microcomputer including a central processing unit (CPU), a read-only memory (ROM) and a random access memory (RAM); and 30, a memory unit for storing the number of times of ink suction by the cap member 10 and a quantity of discharge. The memory unit 30 includes a first memory circuit 31, a second memory circuit 32, and a third memory circuit 33. The first memory circuit 30 is to store a numerical value (k) which is obtained by adding a numerical value every ink purging operation which is determined in proportion to a quantity of ink to be purged. (for instance 10 per 0.1 cc). The second memory circuit 32 stores the number of ink purging operations carried out for a period of time preset by a period-of-time setting circuit 35 (described later), and stores it as a frequency m at the end of the period of time. The third memory circuit 33 integrates the number (n) of ink purging operations and stores it. These memory circuits 31, 32 and 33 are made up of an electrical erasable programmable ROM (EEPROM) or a RAM the contents of which is maintained by a battery. The aforementioned period-of-time setting circuit 35 is typically made up of a timer.

Figure 4:
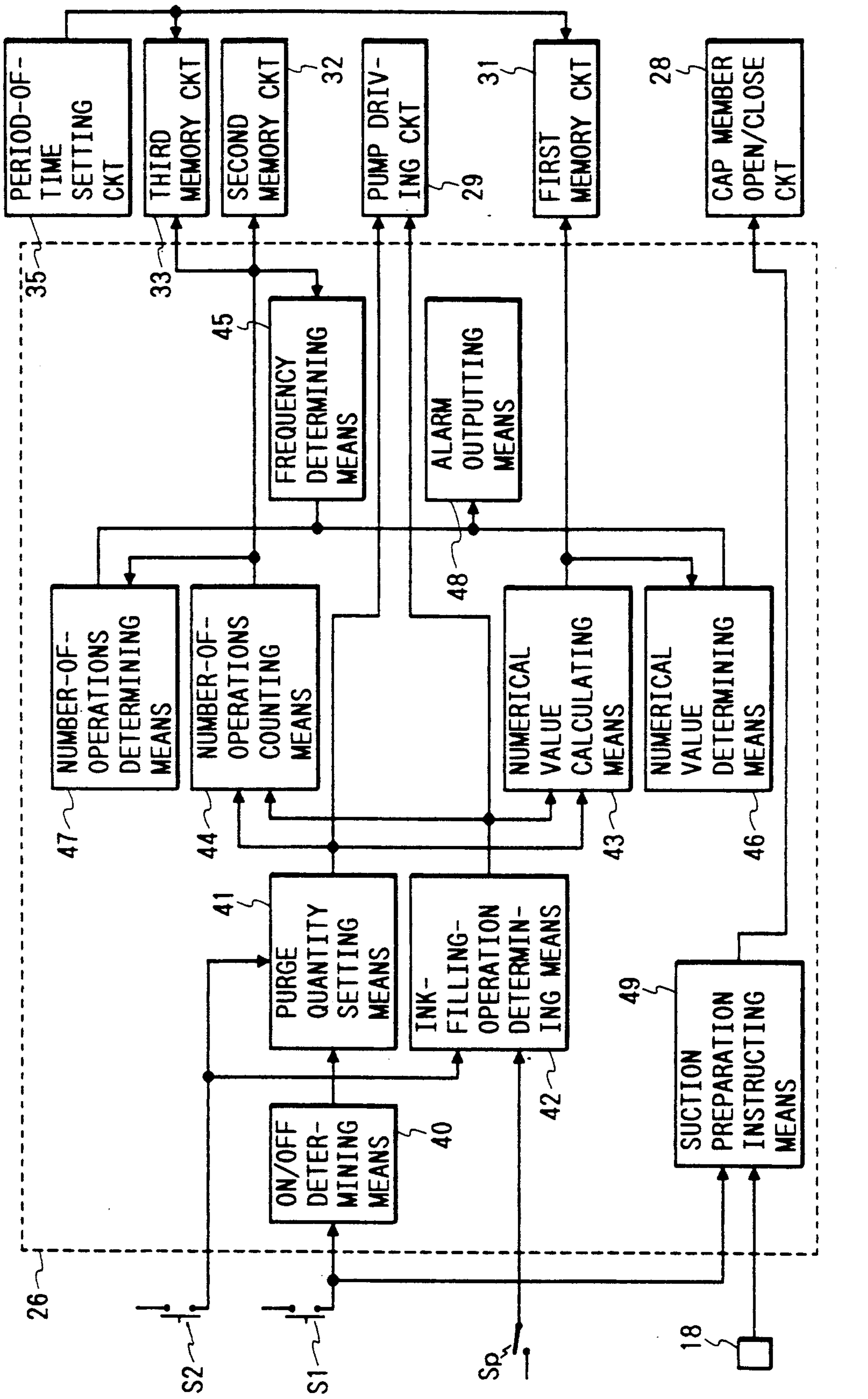
FIG. 4 is a block diagram showing functions performed by a microcomputer in a control unit in the ink jet type recording apparatus.

FIG. 4 is a block diagram showing functions which are realized by the microcomputer which forms the aforementioned control circuit. More specifically, FIG. 4 shows on-off determining means 40, purge quantity setting means 41, ink-filling-operation determining means 42, numerical value calculating means 43, number-of-operations counting means 44, frequency determining means 45, numerical value determining means 46, number-of-operations determining means 47, alarm outputting means 48, suction preparation instructing means 49, all of which are realized by programming. The on-off determining means 40 determines from the operation of an on-line/off-line switch S1 whether an on-line state is established or whether an off-line state is established (whether or not printing data can be received from the host unit). The purge quantity setting means 41 determines a quantity of ink to be purged for the period of time for which a restoring operation instructing switch S2 is depressed. The ink-filling-operation determining means 42 selects an ink purging operation accompanying an operation of charging the recording head with ink when a power switch SP is turned on with the restoring operation instruction switch S2 turned on. The numerical value calculating means 43 adds a numerical value, corresponding to a quantity of ink to be purged, to renew the contents of the first memory circuit 31. The number-of-operations counting means 44 counts the number of operations to thereby renew the contents of the third memory circuit 33. The frequency determining means 45 clears (resets) the contents of the second memory circuit 32 when the period set by the period-of-time setting circuit 35 has passed, and outputs a signal for nullifying an ink purging instruction or a warning signal when the contents of the second memory circuit 32 reaches a predetermined value. The number-of-operations determining means 47 determines the number of depressions of the restoring operation instructing switch S2. The alarm outputting means 48 outputs a message sentence corresponding to the alarm signal, for example, to display the message sentence in an LCD. The alarm outputting means 48 may light an LED or buzz instead of the message sentence. The suction preparation instructing means 49 activates a cap member operating (opening and closing) circuit 28 in response to signals from the position detector 18 and the on-line/off-line switch S1.

Figure 5:
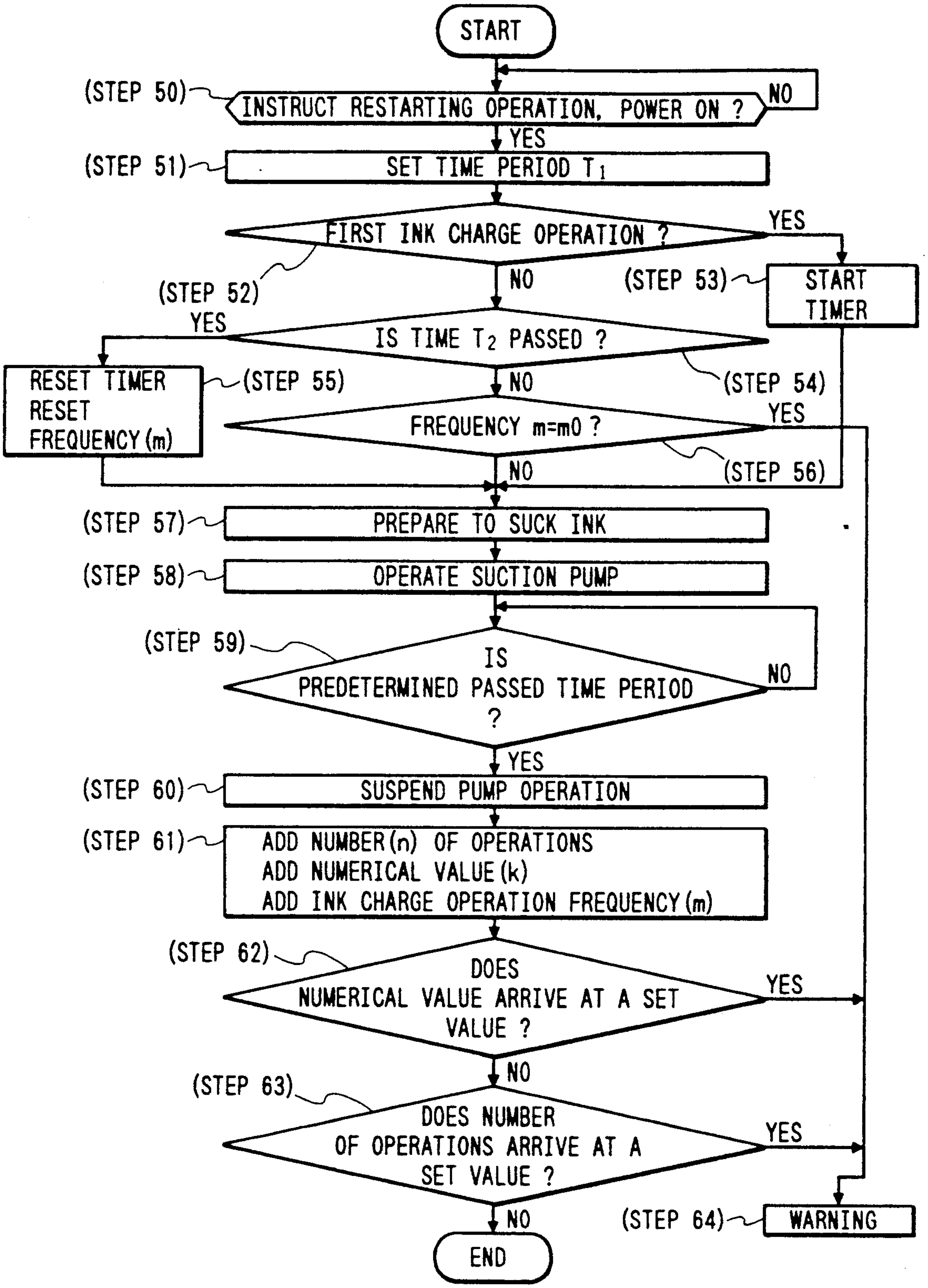
FIG. 5 is a flow chart for a description of an ink charge operation carried out when a recording head is replaced.
Figure 6:
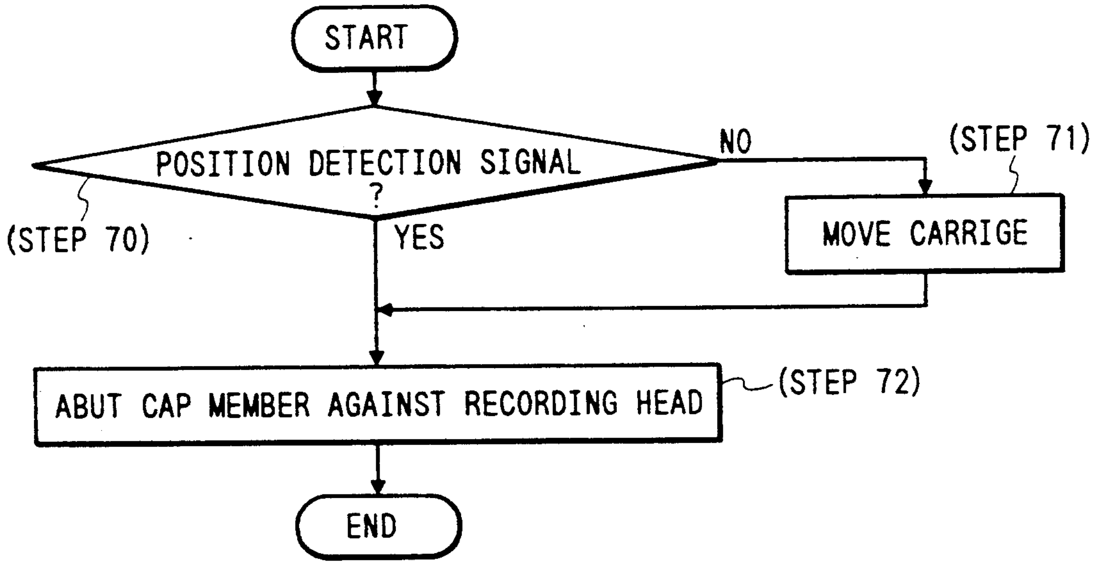
FIG. 6 is a flow chart for a description of an ink sucking operation in FIG. 5.

The operations of the apparatus thus constructed will be described with reference to flow charts shown in FIGS. 5, 6 and 7.

In the case where the printing apparatus is operated for the first time, or the recording head is replaced with a new one, a new ink container 24 is connected to the ink supplying inlet, and the injection needle at the end of the ink supplying inlet 5 is inserted into the ink container 24; that is, the ink container 24 is connected through the tube 59 to the recording head 1.

Under this condition, the power switch SP is turned on with the restoring operation instructing switch S2 depressed. In this case, the control circuit 26 determines that the recording head 1 has not been used yet (Step 50), and sets a period of time T1 which is required for sucking a large quantity of ink, for instance 10 cc, which is to be purged for charging the recording head with ink (hereinafter referred to as "an ink charge operation", when applicable) (Step 51).

This is the first ink charge operation for the recording head 1 (Step 52). Therefore, the timer forming the period-of-time setting circuit 35 is started (Step 53).

The control circuit 26 starts suction preparation (Step 57). The suction preparation is carried out as shown in FIG. 6. It is determined from the presence or absence of the output signal of the position detector 18 whether or not the recording head 1 is located at the predetermined position where it confronts the cap member 10 (Step 70). When the recording head 1 is not located at the predetermined position, the carriage 4 is driven to move the recording head 1 to the cap member 10 (Step 71). Under this condition, the cap member 10 is abutted against the recording head 1 (Step 72) so that the nozzle surface of the recording head 1 is hermetically sealed by the cap member 10.

Upon completion of the suction preparation, the control circuit 26 operates the suction pump 20 (Step 58). The operation of the suction pump 20 is continued for the period of time T1 set in Step 51. In this operation, a negative pressure is applied to the nozzle opening 1*a*, to suck air out of the ink supplying path and the recording head 1 through the nozzle opening 1*a*. When the air has been discharged, the ink in the ink tank 24 is moved to the recording head 1 by the negative pressure applied thereto, thus being jetting into the cap member 10 through the nozzle opening 1*a*. The ink thus jetted is led through the tube 21 to the waste ink tank 23. When the predetermined period of time T1 has passed (Step 59), the control circuit 26 suspends the operation of the suction pump 20 (Step 60), and calculates an ink charge operation frequency (m), a value which is the sum of a numerical value (k) representing the integration of sucked ink quantities and a numerical value )for instance thirty (30)) corresponding to the quantity of ink sucked at this time, and the total number (n) of operations, and stores them in the second memory circuit 32, the first memory circuit 31, and the third memory circuit 33 (Step 61). In this case, the first ink charge operation is carried out, and accordingly the numerical value (k) and the number of ink charges (n) are smaller than the predetermined values (Steps 62 and 63).

In general, in order to protect the recording head 1 during shipment from the factory, the recording head 1 is filled with polyhydric alcohols such as glycerol and ethylene glycol, which are slow to evaporate and high in viscosity. The protective materials are sufficiently washed away from the recording head 1 when a large quantity of ink is purged in the above-described manner. At the same time, the bubbles entering the recording head are removed by the stream of ink, which flows faster than in the printing operation, thus ensuring a high quality of the subsequent printing operations.

In the case where a printing operation is carried out after the ink charge operation is found to be unsatisfactory in print quality, the initial operation of charging the printing head with ink may be unsatisfactory. Therefore, in this case, the above-described operations are carried out once more with the power switch Sp turned off. This is the second ink charge operation (Step 52). The second ink charge operation is started within a short period of time T2 (for instance, one hour) after the previous ink charge operation (Step 54). Therefore, the frequency (m) stored in the second memory circuit 32 is read. If the frequency (m) is smaller than the predetermined value (M0) (for instance three (3)) (Step 56), the above-described Steps 57 through 63 are effected so as to suck the quantity of ink (10 cc) required for the initial use or replacement of the printing head.

Sometimes it is necessary to carry out a third ink charge operation, for instance, because of an error in operation. In this case, the frequency (m) reaches the predetermined value (3) (Step 56). Therefore, the ink charge operation has been carried out satisfactorily; however, the recording head 1 may be out of order. Hence, irrespective of the ink purging instruction, the ink sucking operation is suspended, or a warning "Call the service man" is given (Step 64). Thus, the difficulty can be eliminated that, although the problem involved may not be solved merely by forcibly purging ink uselessly, the user causes ink to be forcibly purged anyway.

Sometimes it is necessary to perform the ink charge operation several days after the previous ink charge operation (Step 54). In this case, the timer forming the period-of-time setting circuit 35 is reset, and the contents (m) of the second memory circuit 32 is also cleared. Therefore, Steps 57 through 63 are effected to suck 10 cc of ink required for the ink charge operation. Thus, the ink charge operations are prevented from being performed too many times; however, in the case where the recording head is out of order, for instance, because it has not been used for a long time or the ink tank was vibrated during transportation, similarly as in the ink charge operation a large quantity of ink is purged through the recording head to restore the printing function.

Figure 7:
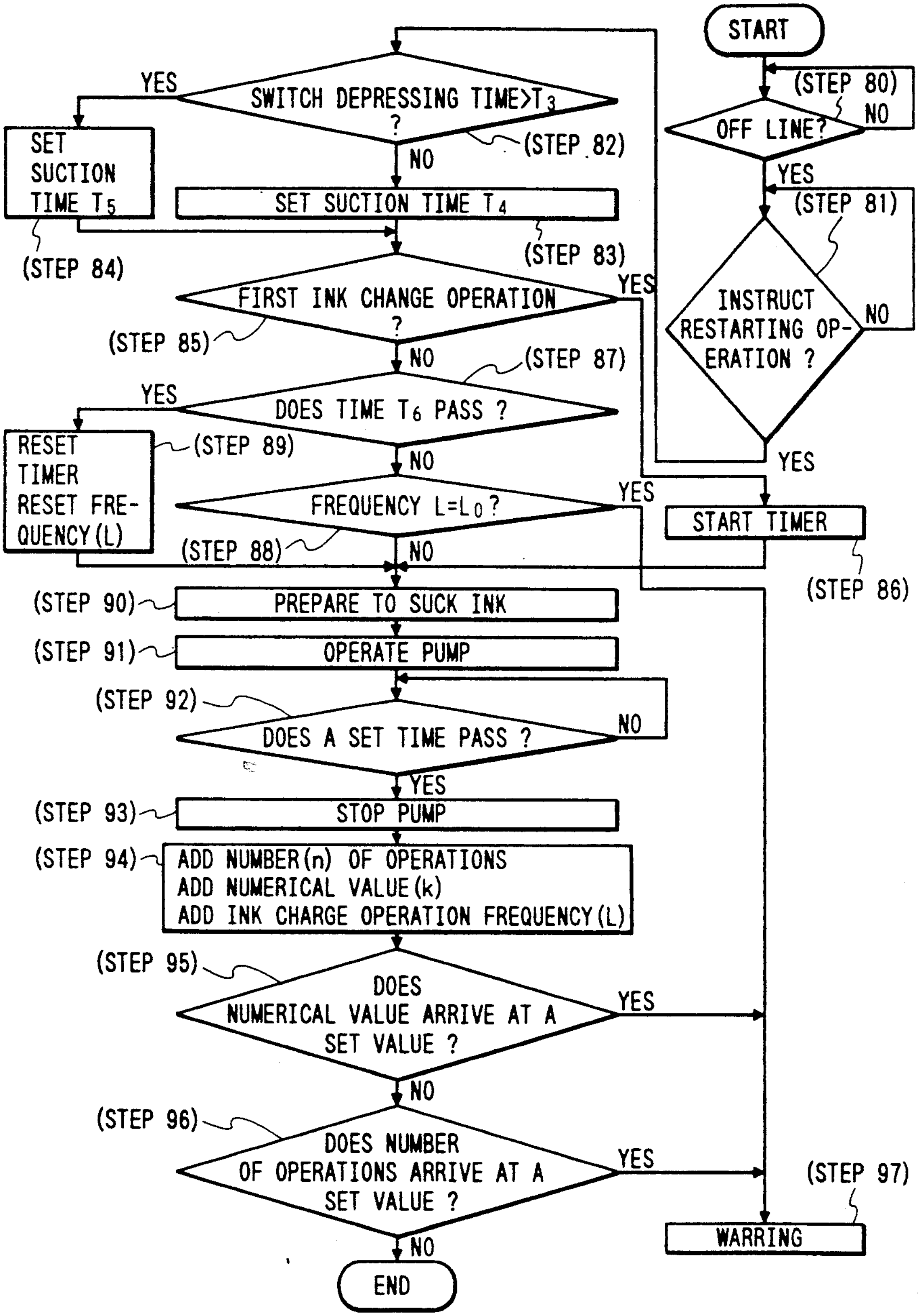
FIG. 7 is a flow chart for a description of an ink purging operation carried out when an ink tank is replaced, or when a restoring operation is performed to restore the proper (i.e., high quality) printing function.

A printing operation is carried out after the recording head has been correctly charged with ink (FIG. 7). If, during the printing operation, the printing quality is lowered, then the on-line/off-line switch S1 is depressed to disconnect the printer from the host unit (Step 80).

When, under this condition, the restoring operation instructing switch S2 is depressed (Step 81), the control circuit 26 detects a period of time Tx for which the switch S2 is kept depressed, and determines a quantity of ink to be sucked from the period of time Tx thus detected (Step 82). More specifically, when the period of time Tx is shorter than a predetermined value T3, a period of time T4 required for sucking a small quantity of ink, for instance, 0.1 cc, is selected (Step 83) whereas, when it is longer than the predetermined value T3, a period of time T5 required for sucking a larger quantity of ink, for instance, 0.3 cc, is selected (Step 84).

This is the first restoring operation (Step 85). Therefore, the timer forming the period-of-time setting circuit 35 is started (Step 86), and the suction preparation is carried out as shown in FIG. 6 (Step 90). When the cap member 10 is coupled to the recording head 1, the control circuit 26 applies an instruction signal to a pump drive circuit 29 to operate the suction pump 20 (Step 91). When the period of time T4 set in Step 83 or the period of time T5 set in step 84 has passed (Step 92), the control circuit 26 stops the suction pump 20 (Step 93). Then, the control circuit 26 reads the number of restoring operations (n) and obtains the sum of the numerical value predetermined for the quantity of ink sucked in and the previous numerical value (k), and stores them in the first and third memory circuits 31 and 33. In this case, the first restoring operation is carried out, and therefore both the numerical value (k) and the number of restoring operations are smaller than the predetermined values (Steps 95 and 96).

Thereafter, the printing operation is continued, and the restoring operation may be carried out again (Steps 80 through 84). In this case, the control circuit 26 refers to the data of the timer forming the period-of-time determining circuit 35 to determine the interval between the present restoring operation and the preceding restoring operation (Step 87). When a predetermined period of time, for instance, one hour, has passed, the restoring operation frequency (L) stored in the second memory circuit 32 is cleared, while the timer forming the period-of-time setting circuit 35 is reset (Step 89). Thereafter, similarly as in the above-described first restoring operation, Steps 90 through 96 are carried out to achieve the present restoring operation.

Sometimes the restoring operation may be carried out frequently. That is, sometimes the number of restoring operations may exceed a predetermined value L0, for instance three, in one hour (Step 88), as a result of which the printing operation cannot be smoothly carried out. This difficulty is not due to dust stuck on the recording head. That is, the recording head 1 itself may be out of order. Therefore, irrespective of the ink purging instruction, the ink sucking operation is suspended, or the warning "Call the service man" is given for inspection of the recording head (Step 97). Thus, the trouble can be solved effectively without useless consumption of ink.

When, after the restoring operation has been carried out repeatedly with a frequency which has been suitably predetermined, the total number of operations (n) stored in the first memory circuit 31 or the numerical value (k) representing the quantity of ink to be purged stored in the third memory circuit reaches the predetermined value (Step 95 or 96), then the control circuit 26 gives a warning message "Replace the waste ink tank" so that the waste ink tank 23 is replaced with a new one (Step 97). Thus, the waste ink tank 23 can be replaced before the waste ink leaks from it.

In the case where the recording apparatus has not been used for a long time or the amount of printing is less, that is, when the ink is less consumed, the ink changes in characteristic, for instance, because the ink solvent components evaporate from the ink flow path or air enters the recording head 1 or the ink supplying path, as a result of which sometimes ink droplets are not satisfactorily jetted through the nozzle opening. Hence, in order to positively maintain the print quality satisfactory irrespective of the amount of print or the frequency of use, a method may be employed in which, whenever the timer forming the period-of-time setting circuit 35 counts a predetermined value, for instance, ten (10) days, a predetermined quantity of ink, for instance, 0.5 to 1.0 cc, is purged.

The fact that the printer is not used for a long time means that the operation of filling the recording head with ink is not carried out either. Therefore, the rate of operation of the recording apparatus can be determined from the data provided by the following method. When a predetermined period of time, for instance, three days, has passed from the preceding ink charge operation, the contents of the second memory circuit 32 is reset. In addition, the periods of time in which no printing operation is carried out, or the amounts of printing are stored in the second memory circuit 32, that is, the amount of printing in a predetermined period of time is stored in the second memory circuit 32.

In the case where in the ink tank is replaced because it has been emptied, the above-described restoring operation is carried out (Steps 80 through 97 in FIG. 7); that is, the quantity of ink required for the ink charge operation is purged from the recording head 1, so as to remove bubbles or foreign matter mixed at the time of replacement of the ink tank.

In the above-described embodiment, the period-of-time setting circuit is made up of the timer; however, the invention is not limited thereto or thereby. That is, the same effect may be obtained by using another period-of-time parameter such as the number of printing lines, the number of printing pages, or a period of time which elapses from the time instant that the power switch is turned on until the power switch is turned off. More specifically, when the amount of printing counted with a counter built into the printer reaches a predetermined value, the frequency data L can be reset. Thus, the restoring operation during a printing operation can be controlled according to the amount of print.

In the above-described embodiment, the ink tank and the waste ink tank are provided on the chassis, and they are connected through the tubes to the recording head. However, it goes without saying that the technical concept of the invention is applicable to an ink jet type printing apparatus in which the recording head, the ink tank and the waste ink tank are mounted, as one unit, on the carriage.

While the invention has been described in connection with the preferred embodiments of the invention, it will be obvious to those skilled in the art that various changes and modifications may be made therein without departing from the invention, and it is aimed, therefore, to cover in the appended claims all such changes and modifications which fall within the true spirit and scope of the invention.

What is claimed is:

1. An ink jet recording apparatus comprising:

a recording head mounted on a carriage such that said recording head is moved along a recording sheet in a horizontal direction thereof to jet ink droplets to form dots on said recording sheet;

an ink tank for supplying ink through an ink supplying path to said recording head;

a cap member arranged outside a printing region such that said cap member is moved to and from a nozzle opening of said recording head;

a suction pump having an ink sucking inlet connected to said cap member and an ink discharging outlet connected to a waste ink tank;

externally operated instructing means to start said suction pump, said instructing means including first switch means for providing an instruction signal to suck a predetermined quantity of ink required for restoring a proper printing condition during a printing operation, and second switch means for providing, when said recording head is replaced, an instructing signal to suck enough ink from said recording head so that a maintenance solution previously charged in said recording head is ejected from said head;

number-of-operations controlling means for controlling a total number of operations of said instructing means in a predetermined period of time; and means for disabling said instructing means when the number of operations of said instructing means exceeds a predetermined value within said predetermined period of time.

2. An ink jet recording apparatus comprising a recording head for jetting ink droplets toward a recording sheet, an externally operated purge instruction member for issuing a purge instruction signalling the start of a purge operation, and a purge mechanism responsive to said purge instruction for performing a purge operation whereby ink is forced through said recording head, said apparatus further comprising:

frequency determining means for determining a frequency of operation of said purge instruction member; and means responsive to said frequency determining means for taking corrective action when said frequency of operation exceeds a predetermined value within a predetermined period of time.

3. An apparatus as claimed in claim 2, wherein said corrective action comprises sounding of an alarm.

4. An apparatus as claimed in claim 2, wherein said corrective action comprises nullification of said purge instruction.

* * * * *